United States Patent [19]
von Stwolinski

[11] 3,864,712
[45] Feb. 4, 1975

[54] PHOTOGRAPHIC CAMERA FOCUSING SCREEN CARRIER

[75] Inventor: Helmuth von Stwolinski, Zurich, Switzerland

[73] Assignee: Anstalt, Studio Gesellschaft fur Industrie-und Modephotographie, Vaduz, Liechtenstein

[22] Filed: June 7, 1972

[21] Appl. No.: 260,407

[30] Foreign Application Priority Data
Sept. 3, 1971 Germany............................ 2144262
Sept. 3, 1971 Germany............................ 7133731

[52] U.S. Cl. ................................. 354/354, 355/52
[51] Int. Cl. .......................................... G03b 13/24
[58] Field of Search ............... 95/50, 51, 37; 355/52

[56] References Cited
UNITED STATES PATENTS
751,347   2/1904   Scheimpflug ........................ 355/52
1,788,645 1/1931   Velten ................................. 95/51 X
2,147,434 2/1939   Gallaher .............................. 355/52
2,494,077 1/1950   Wilkinson ............................ 355/74
2,599,269 6/1952   Markle ................................. 95/86
2,607,268 8/1952   Bartz ................................... 355/52
2,619,014 11/1952  Geddes ................................. 95/50
2,664,781 1/1954   Waller ................................. 355/52

Primary Examiner—John M. Horan
Attorney, Agent, or Firm—William Anthony Drucker

[57] ABSTRACT

Photographic camera with a pivotable focusing screen carrier which is linearly displaceable relative to each of the pivoting axes defined by pivoting devices in the direction of the respective other pivoting axis and over the entire image plane the pivoting devices being mounted on a standard.

17 Claims, 7 Drawing Figures

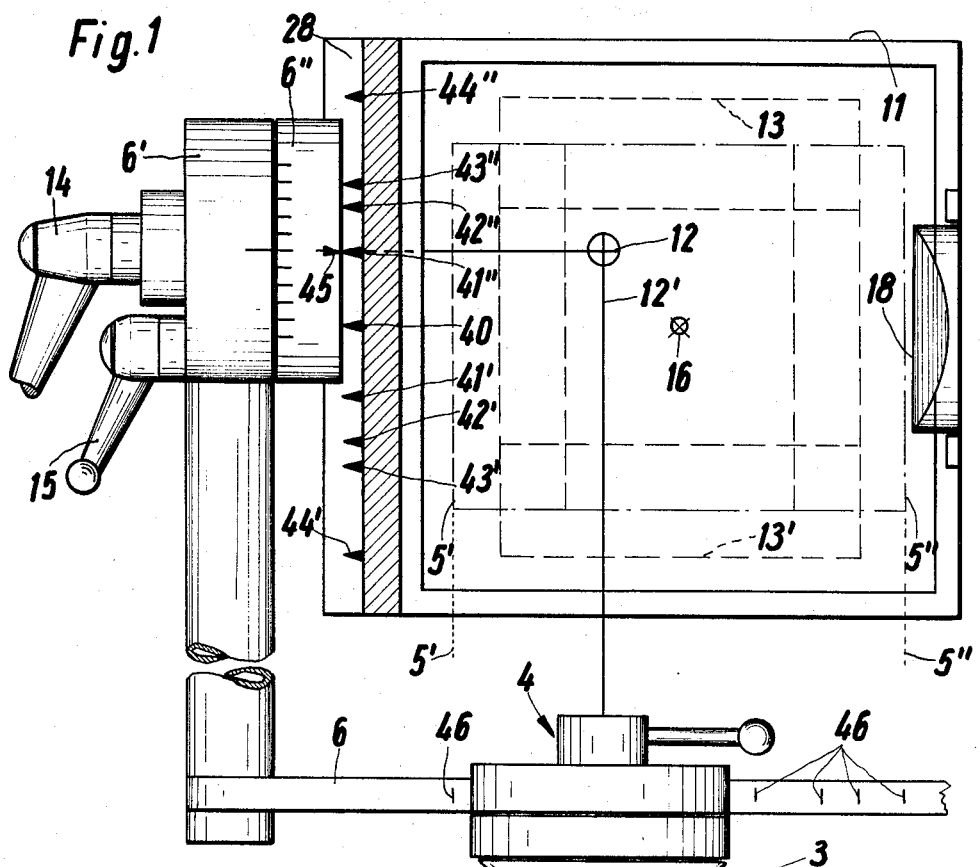
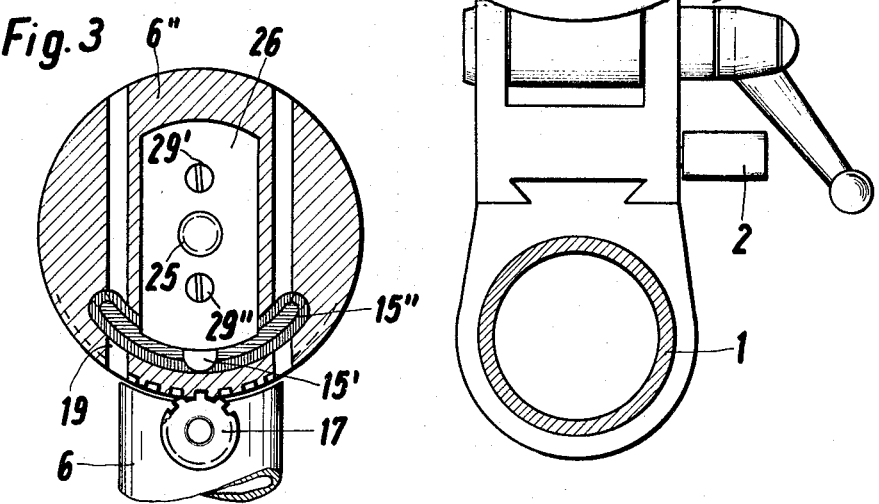

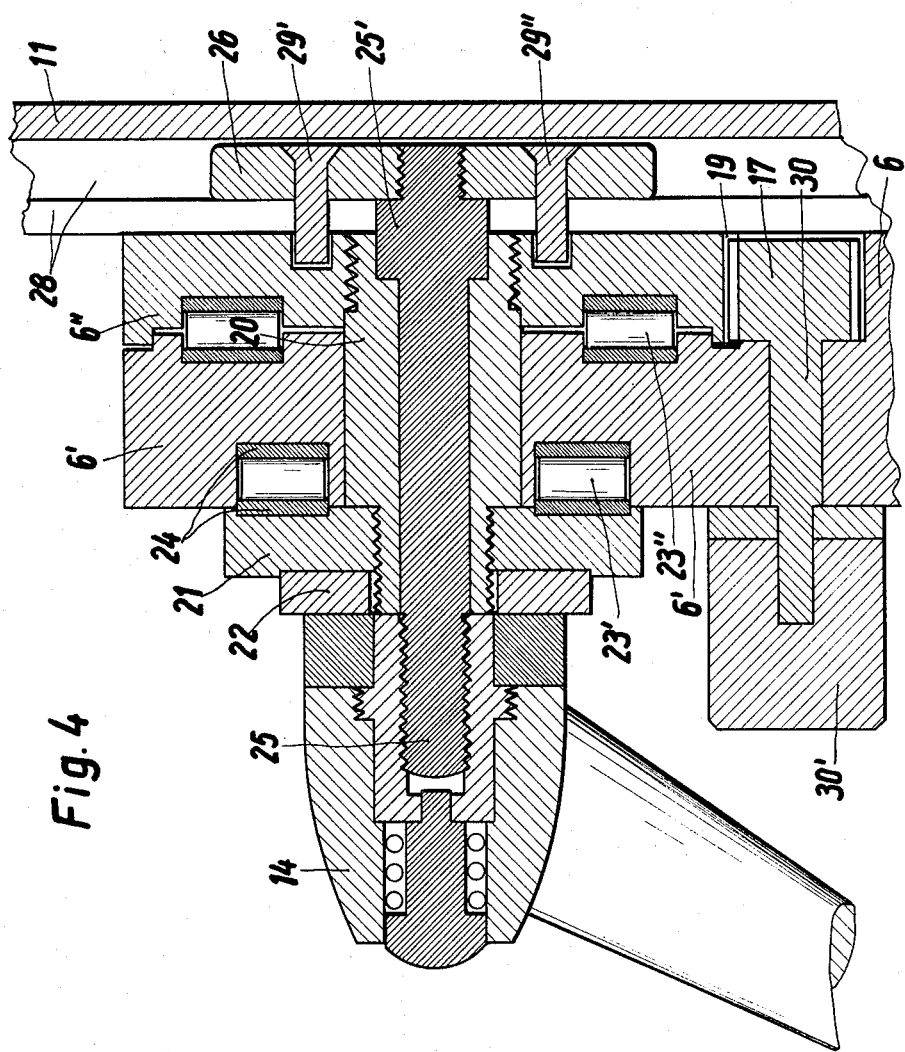

PHOTOGRAPHIC CAMERA FOCUSING SCREEN CARRIER

BACKGROUND OF THE INVENTION

1. Field of the Invention

This invention relates to a photographic camera, more particularly a focusing screen camera having between an objective carrier and an emulsion or focusing screen carrier an extension adjustable along a camera bed.

In cameras of this kind, which are used as professional cameras in particular, at least one of the carriers is additionally pivotable, relative to the camera bed, about one or preferably about two axes parallel to the respective carrier, so as to enable simultaneous sharp focusing on two or three points situated at different distances from the camera and/or to compensate for perspective distortions of the image for example by eliminating converging lines, or on the other hand to enable perspective distortions for the purpose of achieving special effects.

2. Description of the Prior Art

The known cameras of this kind suffer from the disadvantage that the position of their pivoting axes, especially the position of the axis which is horizontal in the position of normal use, is substantially fixed relative to the image field. Cameras with so-called central pivoting are for example known wherein the aforesaid, in normal use horizontal, pivoting axis extends as near as possible through the centre of the objective or of the focusing screen, while in embodiments with base pivoting the horizontal pivoting axes extend below or exteriorly of the focusing screen or of the objective. There are also known cameras which possess both possibilities, i.e., central and base pivoting, but which have rigidly predetermined axes with respect to the focusing screen or the image field.

Furthermore, there is known from German Patent Specifications Nos. 1,276,995 and 1,280,658 a design of a camera wherein for the purpose of more convenient sharp focusing of the camera on two or three points situated at different distances pivoting is performed according to Scheimpflug's law about two mutually perpendicular axes intersecting in the plane of the focusing screen and lying between the centre and the lower edge or between the centre and the left-hand edge of the image. This known design is firstly expensive to construct and unstable as to the mounting of the carrier in question (objective carrier or ground glass carrier), since it is mounted via an additional L-shaped support element provided between the conventional standard and the there provided first pivoting means for the horizontal pivoting axis and a second pivoting device connected to the respective carrier and defining the second pivoting axis. But above all this known device also has the drawback of the pivoting axes being fixed with respect to their position relative to the focusing screen and the image field, such that a transition from one swivelling system to another is not possible and even the Scheimpflug pivoting about off-centre axes, which can only be performed with this device, applies only to a specific basic format. Adaptation to the various currently used reduction formats and/or to special requirements of taking pictures is not feasible.

SUMMARY OF THE INVENTION

Thus the invention relates to a photographic camera, more particularly a focusing screen camera having between an objective carrier and an emulsion or focusing screen carrier an extension adjustable along a camera bed, in which camera at least the focusing screen carrier is pivotable about two mutually perpendicular pivoting axes intersecting in the plane of the focusing screen. The invention is intended to create a camera which combines extreme simplicity of construction with the possibility of selectively employing all known swivelling systems and which in particular enables optimal adaptation of the Scheimpflug pivoting about off-centre axes to various photographic formats and/or special requirements of taking pictures.

In a camera of the above mentioned kind it is for this purpose contemplated according to the invention for the carrier to be linearly displaceable, substantially over the entire plane of the image, relative to each of the pivoting axes defined by pivoting devices and in the direction of the respective other pivoting axis. Preferably provision will be made for the one pivoting axis which in the position of normal use is the horizontal pivoting axis to be defined by a first pivoting device arranged between a standard supporting the carrier and the carrier, for the second pivoting axis to be defined by a second pivoting device arranged between the camera bed and the standard relative to which pivoting device the standard is additionally linearly displaceable parallel to the first pivoting axis, and for the carrier to be linearly movable parallel to the second pivoting axis, relative to the first pivoting device defining the first pivoting axis.

By virtue of the fact that, according to the invention, the position of the pivoting axes or of their point of intersection is optionally selectable within the entire maximum image field a single design of simple construction enables all known swivelling systems (central pivoting, base pivoting, Scheimpflug pivoting about off-centre axes) to be optionally selected, the Scheimpflug pivoting about off-centre axes being capable of being optimally adapted to various photographic formats and/or to special conditions of shooting and more particularly, by shifting the ordinarily horizontal pivoting axis into the upper half of the image and upto the upper image edge or beyond entirely novel possibilities of focusing are obtained.

In accordance with the present invention it is contemplated that the carrier is mounted on an L-shaped standard known per se and provided with the pivoting device defining the first, normally horizontal, pivoting axis at its, in normal position of use, vertical arms, the carrier being linearly displaceable relative to the turning component of this pivoting device and the other arm thereof which in normal position of use is the horizontal arm is connected to the camera bed via the second pivoting device defining the second pivoting axis and is laterally linearly displaceable relative to this second pivoting device. Thus the aforesaid universal possibility of focusing is obtained in an extremely stable manner with a constructionally most simple mounting of the focusing screen (or objective) carrier on a simple L-standard and without additional carrying arm.

With the camera of the invention it is thus ensured that when points or lines have once been focused during the successive focusing and swivelling steps of the focusing operation they are maintained sharp during further course of the operation, whereby the entire focusing operation is appreciably simplified and shortened.

Of special advantage is the possibility, given for the first time by the camera of the invention, of pivoting about an axis lying in the upper half of the image field or at the upper image edge, this possibility of pivoting, when related to a minimum distance given by a bench mounting provided between the two mounting standards, permitting additional shortening of the spacing between objective and ground glass and thus the use of shorter focal lengths of the objective.

According to a further advantageous embodiment there may be provided between the second pivoting device and the camera bed a further pivoting arrangement for tilting about an axis horizontal in the normal position of use. Wobble-free operation is thus ensured during the subsequent rotation about the second pivoting device, even when the standard is inclined.

According to further advantageous embodiments it may be contemplated to provide between the standard and the first pivoting device a further sliding guidance for linear shifting in the direction of the second pivoting axis or to arrange for the upright standard arm carrying the pivoting device to be raisable or lowerable as a whole relative to the horizontal standard arm, and that a further sliding guidance for linear shifting parallel to the first pivoting axis be provided between the second pivoting device and the camera bed; in this manner an up and down movement or sideways shifting of the (focusing screen) carrier is made possible in a manner known per se, with pivoting axes which are now fixed with respect to the carrier.

In accordance with a particularly advantageous constructional embodiment of the invention it may be envisaged that the first pivoting device and a sliding guidance for releasably securing the carrier at any continuously selectable position of level relative to the pivoting device be combined to form a unit. This combination of the pivot joint with the sliding guidance for linear displacement of the carrier relative to the rotatable portion of the joint is particularly well adapted to the requirements of the inventive mounting and affords a constructionally simple, particularly stable and useful mode of construction.

The mounting according to the invention can be provided at the objective standard besides being provided at the emulsion or ground glass standard. According to an advantageous embodiment both the ground glass standard and the objective standard may then be of absolutely identical design, this representing a considerable reduction of production and stock-keeping costs.

The preferred positions of the pivoting axes for the various commercially available picture formats may be indicated by suitable markings, i.e. preferably at the front and back.

BRIEF DESCRIPTION OF THE DRAWING

Embodiments of the invention are hereunder discussed with reference to the drawing in which:

FIG. 1 shows the rear view of a focusing screen standard of a camera according to the invention;

FIGS. 2 and 3 show side views of the first pivot joint viewed from the left and from the right of FIG. 1;

FIG. 4 shows a detailed sectional view of the first pivot joint;

DESCRIPTION OF THE PREFERRED EMBODIMENT

Figure 2:
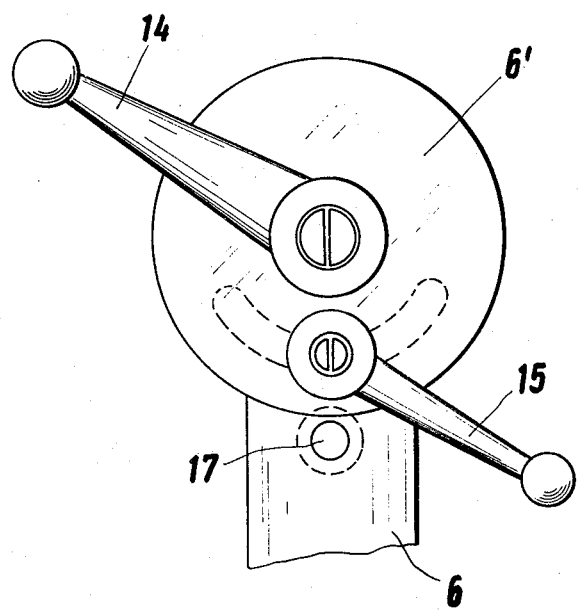

FIG. 1 shows a one-armed standard 6 having a pivot joint 3, the standard 6 being axially displaceable in known manner on a camera bed e.g., an optical bench 1 by means of a micrometer drive 2, being tiltable about a horizontal axis at 3, being rotatable over 360° about a vertical axis at 4, and, according to the invention, being laterally displaceable from the left 5' to the right 5'' image boundary on the horizontal circle of rotation 4. The standard 6 may be produced in one piece, and if so, by injection moulding or pressing, such that it also carries on its vertically upstanding arm the housing 6' of an inventively provided frame-pivoting joint 6', 6''. The frame 11 of the focusing screen is releasably secured to the rotation plate 6'' of this pivot joint and it is vertically movable by means of a sliding guidance 28 and can be locked in position, by means of a clamping lever 14, in the vertical position it occupies at any given time. The focusing screen frame 11 and its sliding guidance 28 are jointly adapted to be pivoted up to 120°, independently of the standard, about the axis 12 defined by the frame-pivoting joint 6', 6'' of the invention.

In the drawing the camera is in its normal position for the format 6 × 6 or 6 × 9 across.

The axis 12 defined by the frame-pivoting joint 6', 6'' extends in the illustrated position exactly in the image plane in the upper half of the image for the format 6 × 9 across or 6 × 6.

When the frame 11 is moved upward after releasing of the locking lever 14, then the axis 12 defined by the pivot joint moves virtually in the plane of the image over the entire image field until the frame and sliding rail have reached their uppermost level, the pivoting axis finally extending along the lower image edge 13' for the upright format 4 × 5 inches. Correspondingly, by moving the frame downward from the illustrated position the axis 12 can be sifted to the upper image edge 13 for the upright format 4 × 5 inches.

With the clamping lever 14 tightened and after relasing the second clamping lever 15 the focusing screen frame, and with appropriate construction also the objective frame, can be pivoted up to 120° about the axis 12 at any level between the upper and the lower image boundary. All clamping levers are in known manner adapted for disengagement and can be re-engaged in any desired position so as to ensure optimal serviceability. If the pivoting axis 12 lies above the image centre 16 the frame quasi pendulates on the horizontal axis 12, while when pivoted about the axis 12 lying lower than the image centre the frame is supported in conventional manner, so-to-speak tipping on the horizontal of the pivot joint.

As is shown in detail in FIG. 4 a cross-toothed micrometer drive 17 for most precise adjustment of the pivoting position required at any time is provided beneath the rotating plate of the frame-pivotng joint 6', 6".

By means of the lateral linear displaceability of the standard 6 relative to the horizontal circle of rotation 4 the second (normally vertical) pivoting axis 12' can correspondingly be shifted in the image plane relative to the frame 11 over the entire area from the left image edge 5' to the right image edge 5". Thus, in conjunction with the displaceability of the first axis 12 it becomes possible to shift the point of intersection 12" of the two pivoting axes 12 and 12' within the entire image field and, for example in the Scheimpflug pivoting about off-centre axes, to optimally select it in adaptation to the photographic format in use and to the conditions determined by the objective.

Suitably the mountings 18 of the rear portion of the focusing screen or - at the front standard - of the objective support, bellows etc., are not arranged atop the frames as is customary, but at their sides, so as to facilitate operating also after the frame has been pivoted 180° about the horizontal. The execution of the mountings 18 and of the frames 11 as such can be of conventional kind and does not form subject of the invention.

The horizontal circle of rotation 4 is situated above the additional arrangement 3 for vertical pivoting so that wobble-free pivoting of the standards is made possible both with horizontal and with inclined camera bed 1.

FIG. 2 shows the lateral view (seen from the left in FIG. 1) of the housing 6' of the frame-pivoting joint of the invention, with the clamping lever 14 for locking at the desired frame level and the clamping lever 15 for locking of the desired pivotal position of the frame as well as with the micrometer drive 17 of the precision adjustment of pivoting. The clamping lever 15 could alternatively be disposed above the clamping lever 14 so as to facilitate operation of the micrometer drive 17 for the pivotal position of the frame beneath the pivot joint housing 6'. Alternatively, the micrometer drive 17, i.e., pinion and toothed rim, could in turn be mounted interiorly of the housing of the pivot joint.

FIG. 3 shows a rear view of the rotatable plate 6" of the frame-pivoting joint, with clamping arrangement 15 and pinion of the micrometer drive 17. The plate 6" is provided with cross-toothing 19 over about 120° of its underside, with which the pinion meshes. The clamping axis is designated by the reference numeral 25 and a clamping shoe by the numeral 26.

FIG. 4 shows a detailed sectional view of the framepivoting joint 6', 6" according to the invention. The one-armed standard 6 carries the housing 6' of the pivot joint. On the rotatable plate 6" of the pivot joint the main axis 20 of the joint is stationarily mounted exteriorly of the housing by means of two co-rotating nuts 21 and 22. Between the housing 6' and the nut 21 as well as between the housing 6' and the rotatable plate 6" there are two needle or roller bearings 23' and 23" running between ground steel discs 24. The main axis 20 is hollow-cylindrical. In the central bore there is mounted a second axis 25 carrying at one end a clamping shoe 26 for the sliding guidance and provided at the other end with a thread on which the clamping lever 14 is rotatably mounted.

The clamping axis 25 is provided with a flange 25' received in a bore at the face of the joint axis 20 and projecting into the guide slot of a slide rail 28 rigidly connected with the frame 11. A sliding guidance and clamping shoe 26 is threadedly engaged or rigidly connected by other means to the end of the clamping axis 25'. The clamping shoe 26 is within the T-profile 28 slideably engaged therewith. The clamping shoe 26 is provided with two pins 29' and 29" loosely engaging in bores in the rotary plate 6" and preventing the clamping shoe 26 and the T-profile 28 turning with respect to the rotary plate 6". The rotary plate 6" has on its periphery a toothing 19 enmeshed with the pinion 17 connected to an axis 30 rotatably mounted in the standard arm 6 and carrying a rotary knob 30' by means of which the pivotal position of the frame can be precisely adjusted.

Alternatively, the pinion 17 may be replaced by the clamping arrangement 15 (FIGS. 2 and 3) not shown in FIG. 4. The clamping pin 15' is guided in a slot 15" located on the reverse side of the rotary plate 6" (of FIGS. 1 to 3).

Figure 5:
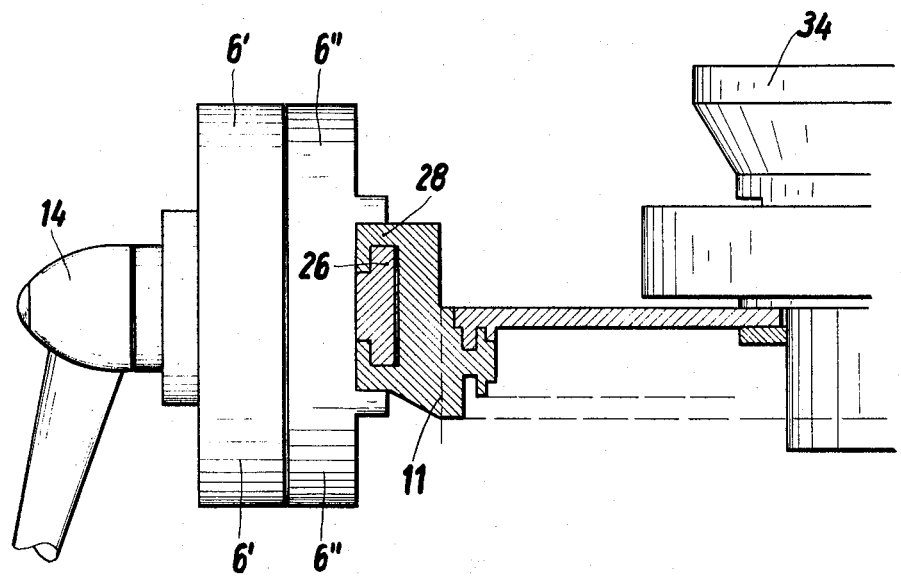
FIGS. 5 and 6 show an objective standard or a focusing screen standard constructed in accordance with the invention, in partially sectional plan view.
Figure 6:
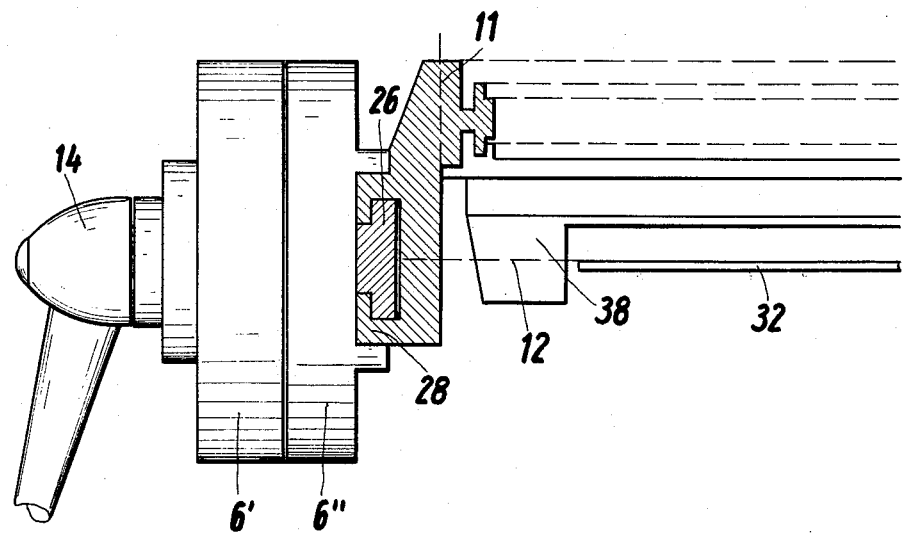

FIGS. 5 and 6 show the frame 11 of one-piece construction with the T-profile 28, i.e., FIG. 5 shows the application of the invention to the objective standard with the objective 34, while FIG. 6 shows the application to the focusing screen standard with the rear portion of the focusing screen 38 which, according to the invention, is accurately pivotable to the image plane 32 about pivot joint axis 12. The frames shown in FIGS. 5 and 6 are identical and therefore can be optionally mounted to the clamping shoe 26, such that the standard constructed according to the invention may be used for mounting the objective or for mounting the focusing screen, in identical manner.

If one of the two frames which are identical as such is used on the focusing screen standard, then a replacement sliding carriage may be optionally connected to the back.

As mentioned earlier, the above described camera design according to the invention provides a hitherto not available, universal means of focusing optimally adapted to the existing conditions of shooting and to the format in use together with extreme simplification of construction. While in the past the user of a specific camera could for example only dispose of base pivoting or at best of central and base pivoting or only Scheimpflug pivoting (about invariably fixed pivoting axes), the inventive design enables the user to selectively use all the above, known, pivoting systems, i.e., base, central and Scheimpflug pivoting, and the latter optionally about axes lying in the upper or lower as well as in the left or right image field, and including a heretofore unknown pivoting about an axis lying at or above the upper image edge (i.e., counterpart to base pivoting).

To facilitate adjustment of the pivoting axes 12, 12' to the preferred positions for the various commercially available formats, preferably coloured markings may be provided which are indicated in FIG. 1 at 40 to 44 laterally of the frame 11 in cooperation with a marking 45 on the rotary plane 6" of the frame-pivoting joint for fixing the horizontal pivoting axis 12 for vertical displacement of the frame 11, and at 46 at the lower portion of the standard 6 for fixing the second pivoting axis 12' when laterally displacing the standard 6 relative to the horizontal circle of rotation 4. Starting from a central marking 40 (corresponding to central pivoting) the individual markings for setting the horizontal axis 12 may be 41' and 41" for the 6 × 6 cm format or 6 × 9 cm transverse format, the markings 42', 42" for the Linhof Ideal format, the markings 43', 43" for example for the 6 × 9 cm upright format or the 4 × 5 inch transverse format, and the markings 44' and 44'' for lower image edge pivoting (true base pivoting) or the entirely novel upper image edge pivoting respectively. In this contect the singly ticked markings correspond to the Scheimpflug pivoting about axes lying in the lower half of the image and the double ticked markings to pivoting about axes lying in the upper image half. Analogously the same applies to the markings 46 for adjusting the second pivoting axis 12' in lateral direction, for adaptation to the various photographic formats and/or to the characterstics of the objectives.

Of particular interest is the Scheimpflug pivoting about pivoting axes 12 lying above the image centre which is made possible by the invention. This can provide special advantages in some cases of application, as can be seen from the following explanation with reference to FIG. 7.

Figure 7:
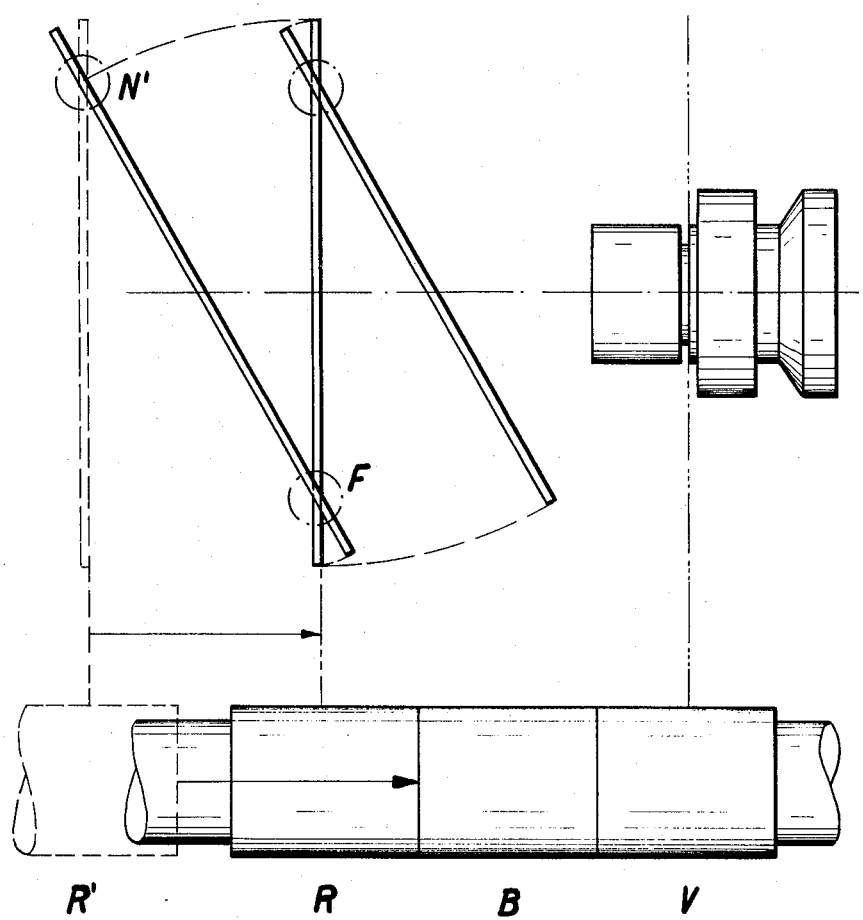
FIG. 7 is a scehmatic representation illustrating the geometrical relationships upon pivoting of the focusing screen carrier about a horizontal pivoting axis lying in the lower or upper image field when the objective standard is in vertical position.

FIG. 7 schematically illustrates the geometrical differences of Scheimpflug rotations below and above the image centre respectively. The (forward) objective standard is designated by the reference symbol V, the bench mounting by the symbol B and the focusing screen standard by the symbol R. Let us assume that the focusing screen standard is in a position wherein the distance point is already sharply reproduced on the focusing screen, it being impossible in the fully extended case illustrated to move the standard R nearer to the objective, on account of the bench mounting B. When then the focusing screen is, in manner known per se, tilted back about the distant point beneath the image centre, then a sharp reproduction of the near point N' is readily obtained without the sharp focus of the distant point being lost.

But when, using the same standard and the same objective, the near point is first sharply focused above the image centre, then the vertically standing standard must in this case first be brought into the position R' drawn in broken lines. When the focusing screen is next pivoted toward the optical system, about the near point N' which has just been sharply focused in the upper image field, then the distant point F is also obtained in sharp focus without the near point N' being lost. Thus, while in the first focusing operation the standard R assumed for spatial reasons the position most closely adjacent the bench mounting B, in the second focusing operation resulting from pivoting about an axis lying above the image centre the standard is transposed by a considerable distance to the position R' drawn in broken lines, for example by 51 mm toward the rear, the attitude of the focusing screen being the same in both cases.

When the Scheimpflug pivoting in the upper image field is used the standard R' is thus still widely spaced from the bench mounting, for example the same reproduction. This permits shorter focal lengths to be used under otherwise equal spatial conditions. When, in such a case, an objective of much shorter focal length is employed, then the standard R' can, if necessary, be moved nearer to the objective, i.e., that much nearer that half of the focusing screen is finally positioned in the same pivotal attitude above the bench mounting B.

It is clearly apparent from the above that the relocation of the Scheimpflug pivoting axis into the upper image field, which is rendered possible by the invention, can provide appreciably more favourable possibilities of focusing than does a system timed to stationary axes in the lower image field.

I claim:

1. In a photographic camera, more particularly a focusing screen camera, having, between an objective carrier and an emulsion or focusing screen carrier, an extension adjustable along a camera bed, in which camera at least the focusing screen carrier is pivotable about two mutually perpendicular pivoting axes intersecting in the plane of the focusing screen, the improvement in which: the focusing screen carrier is linearly displaceable relative to each of the pivoting axes defined by pivoting devices in the direction of the respective other pivoting axis and over the entire image plane, so that the point of intersection of the axis in the image plane of the focusing screen is selectable over the area of the focusing screen; and in which the carrier is mounted on a standard having at least one vertical and one horizontal arm and provided on its, in normal position of use, vertical arm with the pivoting device defining the first, normally horizontal, pivoting axis, relative to the rotatable portion of which pivoting device the carried is linearly displaceable; and the other, in normal position of use, horizontal arm of the standard is connected to the camera bed via the second pivoting device defining the second pivoting axis, and is laterally linearly displaceable relative to the second pivoting device.

2. A camera according to claim 1 in which the mounting standard is L-shaped.

3. Camera according to claim 1, wherein the first pivoting device is combined to a unit with a sliding guidance for releasably locking the carrier at any optional, continuously selectable, level with respect to the pivoting device.

4. Camera according to claim 3, wherein the first pivoting device is provided with a plate or disc shaped housing portion rigidly connected to the standard and having a central bore receiving a joint axis, a portion rotatable relative to the stationary housing portion about the pivot axis, and a clamping shoe untwistably connected to the rotatable portion, which clamping shoe is in engagement with a profile portion of the sliding guidance for linear displacement of the carrier and is adapted to be clamped with respect to the carrier in any relative position for the purpose of locking the carrier in position.

5. Camera according to claim 4, wherein the pivot joint axis is of hollow configuration and receives an axially displaceable arresting axis carrying at one end the clamping shoe in engagement with the profile portion of the sliding guidance, the clamping shoe being secured against rotation relative to the rotary plate by means of pins, and the axis being provided at its other end exteriorly of the pivot joint or of the standard with a clamping lever for releasably clamping the clamping shoe to the profile portion of the sliding guidance.

6. Camera according to claim 4, wherein the rotary plate of the first pivoting device is provided with a toothing on a portion of its periphery corresponding to the pivoting range, with which toothing a pinion of a micrometer drive meshes for precise pivoting adjustment.

7. Camera according to claim 4, wherein a needle or roller bearing is provided between the rotary plate and the stationary housing of the first pivoting device.

8. Camera according to claim 4, wherein a further clamping device is provided for releasably clamping the rotary plate with respect to the stationary housing portion of the first pivoting device, such that the two portions of the pivot joint are adapted to be arrested by being locked in any continuously selectable relative position within a pivotal range preferably predetermined by a slot.

9. Camera according to claim 3, wherein the extent of the sliding guidance for linear displacement of the carrier relative to the first pivoting device at least corresponds to the height of the carrier frame.

10. Camera according to claim 3, wherein there are provided on the focusing screen or the carrier or the sliding guidance markings for the preferred position of the first pivoting axis.

11. Camera according to claim 1, wherein the second pivoting device defining the initially vertical second pivoting axis is designed as an initially horizontal circle of rotation to the rotatable portion whereof the, in normal use position, horizontal arm of the L-standard is linearly displaceably by means of a sliding guidance releasably mounted so as to be arrestable in any continuously selectable position.

12. Camera according to claim 11, wherein the sliding guidance for linear displaceability of the standard relative to the second pivoting device is of a length corresponding to at least the maximum of the focussing screen width.

13. Camera according to claim 11, wherein markings for indicating the preferred position of the second pivoting axis are provided.

14. Camera according to claim 1, wherein between the second pivoting device and the camera bed there is provided a further pivoting device for pivoting about an axis horizontal in normal position of use.

15. Camera according to claim 3, wherein between the standard and the first pivoting device there is provided a further sliding guidance for linear displacement in the direction of the second pivoting axis.

16. Camera according to claim 3, wherein between the second pivoting device and the camera bed there is provided a further sliding guidance for linear displacement parallel to the first pivoting axis.

17. Camera according to claim 1, wherein the focusing screen carrier and the objective carrier are of identical design.

* * * * *

UNITED STATES PATENT AND TRADEMARK OFFICE
CERTIFICATE OF CORRECTION

PATENT NO. : 3,864,712

DATED : February 4, 1975

INVENTOR(S) : Helmuth von Stwolinski

It is certified that error appears in the above-identified patent and that said Letters Patent are hereby corrected as shown below:

In Item 30 please cancel the foreign application priority dates as follows:

"Sept. 3, 1971 Germany............2144262"
"Sept. 3, 1971 Germany............7133731"

Signed and Sealed this

Thirtieth Day of November 1976

[SEAL]

Attest:

RUTH C. MASON
*Attesting Officer*

C. MARSHALL DANN
*Commissioner of Patents and Trademarks*